Oct. 9, 1923.
H. W. KIRCHNER
1,470,266
INTERCHANGEABLE UNIT CARRIER
Filed Feb. 16, 1920  3 Sheets-Sheet 1
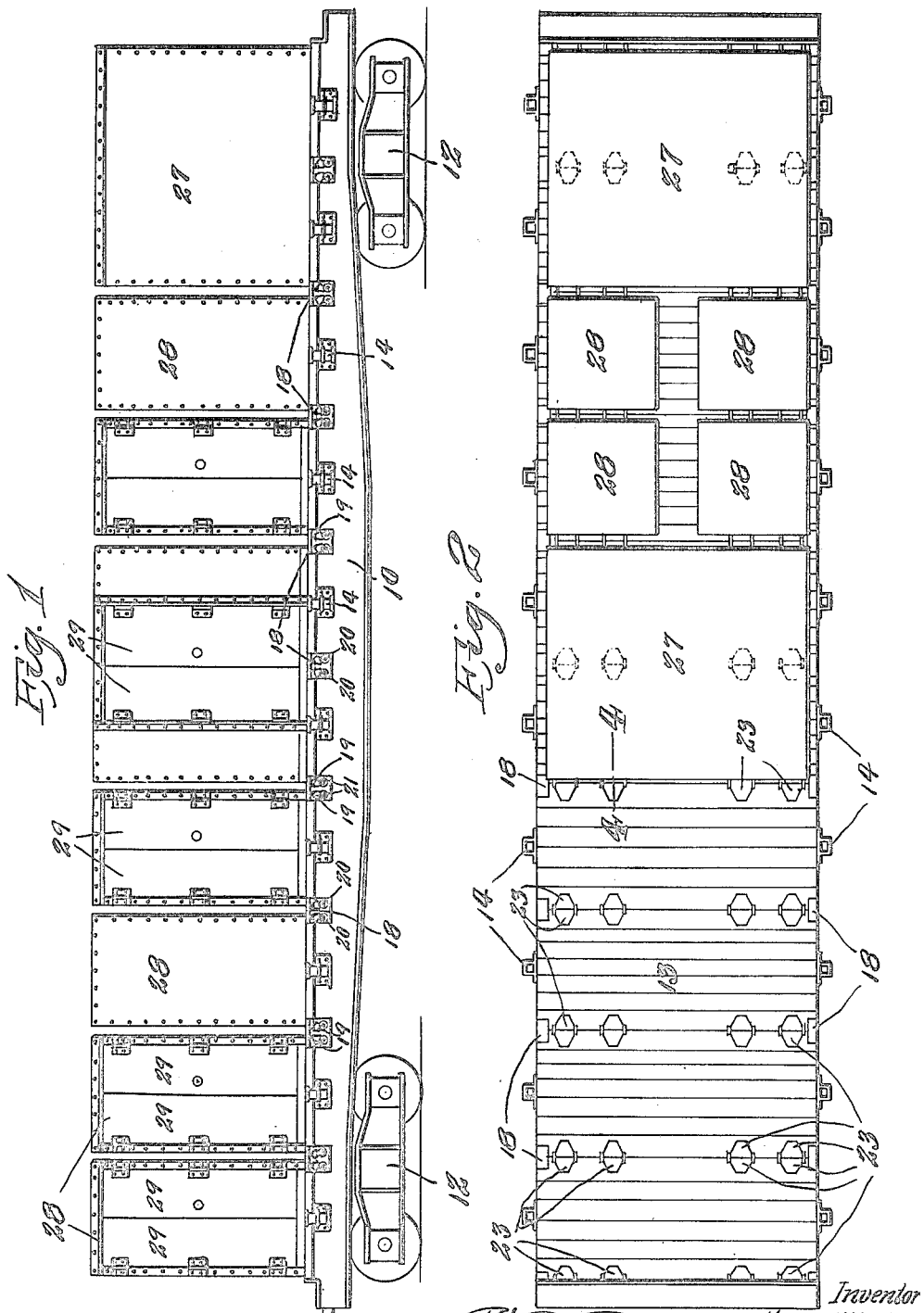

Oct. 9, 1923.  1,470,266
H. W. KIRCHNER
INTERCHANGEABLE UNIT CARRIER
Filed Feb. 16, 1920  3 Sheets-Sheet 2
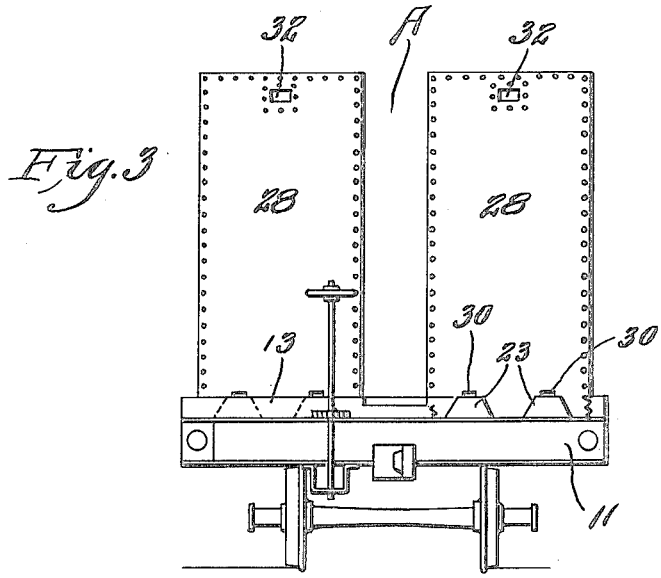
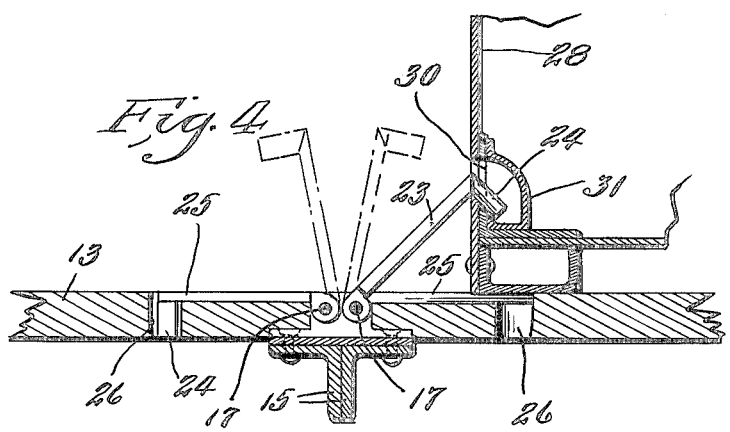
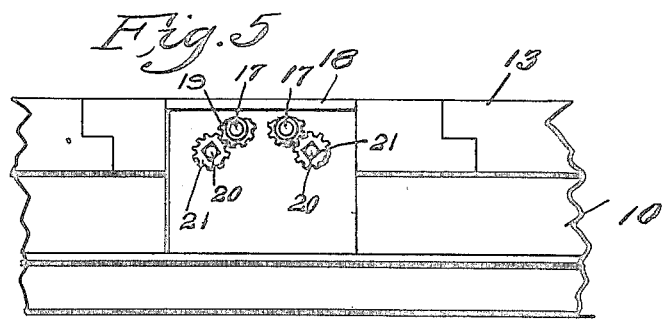
Inventor
Henry W. Kirchner Oct. 9, 1923.  1,470,266
H. W. KIRCHNER
INTERCHANGEABLE UNIT CARRIER
Filed Feb. 16, 1920  3 Sheets-Sheet 3
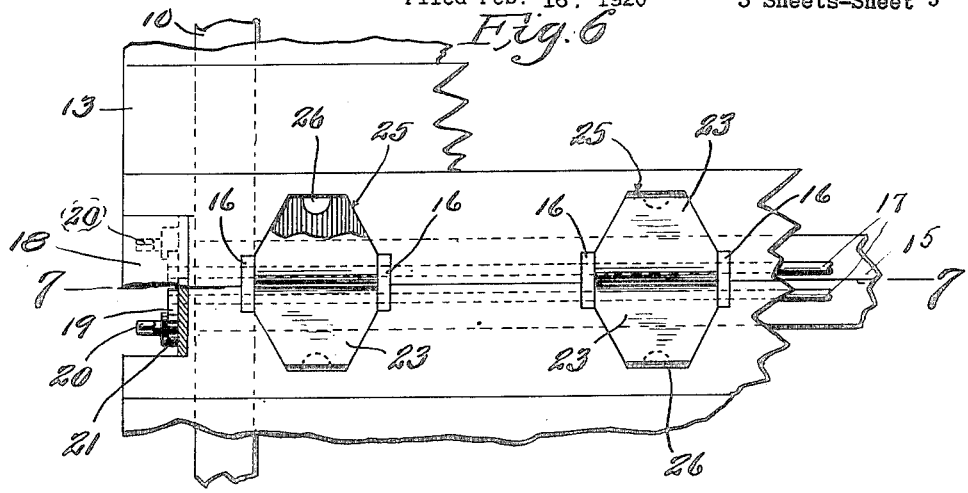
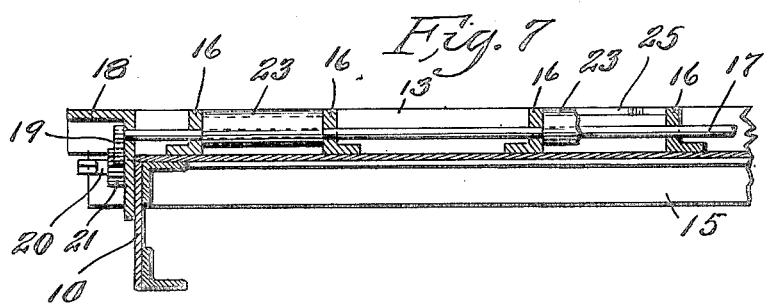
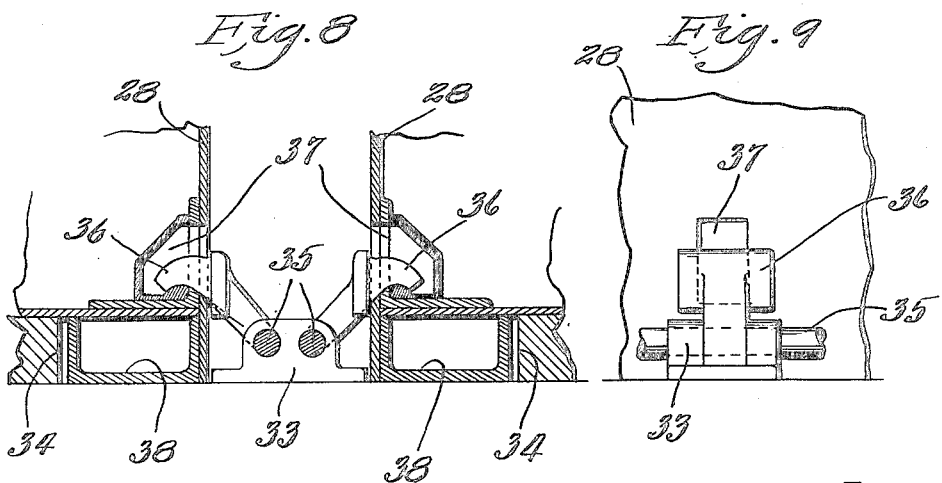
Inventor
Henry W. Kirchner Patented Oct. 9, 1923.

1,470,266

UNITED STATES PATENT OFFICE.

HENRY WILLIAM KIRCHNER, OF ST. LOUIS, MISSOURI.

INTERCHANGEABLE-UNIT CARRIER.

Application filed February 16, 1920. Serial No. 359,071.

*To all whom it may concern:*

Be it known that I, HENRY W. KIRCHNER, a citizen of the United States, residing at St. Louis, State of Missouri, have invented a certain new and useful Improvement in Interchangeable-Unit Carriers, of which the following is a full, clear, and exact description, such as will enable others skilled in the art to which it appertains to make and use the same, reference being had to the accompanying drawings, forming part of this specification.

My invention relates to improvements in means for transporting and facilitating the handling of freight, while in transit, the principal objects of my invention being to generally improve upon the present methods of handling and transportation of freight; and to provide a practical medium for the universal interchange of freight between motor truck, freight car, barge, and ship.

My present invention is an improvement upon the constructions disclosed in my United States Letters Patent, Nos. 885,162, granted April 21, 1908, 922,293, granted May 18, 1909, 997,300, granted July 11, 1911, and 1,026,752, granted May 21, 1912, and my copending applications, Serial No. 156,581, filed March 22, 1917, and Serial No. 208,363, filed December 22, 1917.

The foregoing patents and applications disclose various forms of interchangeable car units and carriers wherein the freight or material to be transported is carried in specially formed containers or units which are adapted to be individually moved and interchangeably positioned upon the underframe of the carrier and upon different similar carriers. This construction and arrangement obviates the general practice of storing freight in bulk or placing the same in a single mass for transportation on carriers, and permits the load or cargo to be divided and stored in convenient quantities in receptacles which are susceptible of being easily and quickly handled.

In practically all of the constructions disclosed in the above-mentioned patents and applications, the frame or body of the carrier must be specially constructed in order to receive the interchangeable unit containers, and it is one of the principal objects of my present invention to provide a carrier that is adapted to receive certain types of interchangeable freight containers, and said carrier being constructed so that it can be loaded with any kind of freight, for instance, with logs, rails, ties, and large pieces of freight which cannot be placed in the interchangeable unit containers. By virtue of this arrangement, I am able to provide a car which will perform all of the functions of the ordinary flat car largely used for the transportation of bulk freight and said car being provided with means for receiving and holding unit containers, and which latter combine with the carrier or flat car to form a car which will perform practically all of the functions of a box car.

A further object of my invention is to provide a carrier underframe or chassis with fastening means that is capable of being readily manipulated to engage and hold on said underframe or chassis interchangeable unit containers, and which latter may be of equal or unequal dimensions or capacities.

A further object of my invention is to provide a relatively simple form of interchangeable unit securing means, and to construct and arrange the same so that all parts thereof while not in use will occupy positions below or flush with the top surface of the carrier underframe or chassis, thereby in nowise interfering with ordinary loads of freight, other than the interchangeable unit containers, which may be positioned upon the carrier.

With the foregoing and other objects in view, my invention consists in certain novel features of construction and arrangement of parts, hereinafter more fully described and claimed, and illustrated in the accompanying drawings, in which—

Figure 1 is an elevational view of a carrier in the form of a flat car and upon which are positioned a number of interchangeable unit containers.

Figure 2 is a plan view of the carrier with a number of unit containers positioned thereupon.

Figure 3 is an end elevational view of the carrier with unit containers positioned thereupon.

Figure 4 is an enlarged vertical section taken approximately on the line 4—4 of Figure 2.

Figure 5 is an elevational view of the rack and pinion mechanisms utilized for actuating the unit container securing means.

Figure 6 is an enlarged plan view of the unit securing means.

Figure 7 is a section taken approximately on the line 7—7 of Figure 6.

Figure 8 is a sectional view showing a modified form of the unit securing means.

Figure 9 is an elevational view of the modified form of the unit securing means.

Referring by numerals to the accompanying drawings, which illustrate a practical embodiment of my invention, 10 designates the side sills of a flat car underframe, 11 the end sill, and 12 the usual trucks which support and carry said underframe. Arranged on top of the underframe is a substantially flat floor 13, preferably formed of transversely disposed matched planks. Secured to the outer faces of the side sills 10 of the underframe and suitably spaced apart are hollow metal boxes or brackets 14, which perform the functions of stake pockets.

Secured in any suitable manner to the side sills 10 of the underframe and arranged at equal distances apart are transversely disposed frame members 15, each of which is made up preferably of a T-bar or a pair of angle bars, and a flat plate top member, the latter occupying a position directly against the undersurface of the planking forming the floor of the carrier. (See Figs. 4 and 7.)

Fixed in any suitable manner to each of these cross members 15 are upwardly projecting pairs of brackets 16, the tops of which lie flush with the top surface of the flooring 13 and journaled in these brackets is a pair of rock shafts 17, the latter extending from one side of the carrier body to the other. The ends of these rock shafts pass through inverted L-shaped brackets 18 that are secured to the side sills 10 at the ends of the transverse members 15, and secured to the ends of said shafts and positioned against the outer faces of the upright portions of the brackets 18 are toothed segments 19.

Journaled in suitable bearings in the upright portions of the brackets 18 are short outwardly projecting shafts 20, the outer ends of which are made square or non-circular in order to receive a suitable operating handle, and carried by these shafts 20 are pinions 21 that mesh with the teeth of the segments 19.

Fixed in any suitable manner to the rock shafts 17 and arranged between the pairs of brackets 16 are plates 23, the free ends of which are provided with fingers or hooks 24, the latter being disposed substantially at right angles to the planes occupied by said plates 23. Portions of the planking forming the floor 13 of the carrier immediately adjacent to the pairs of brackets 16 are cut away to form recesses 25 and which latter accommodate the plates 23 when the same are swung downward into out-of-the-way positions, and for the accommodation of the hooks or fingers 24, apertures such as 26 are formed through the planking at the outer ends of said recesses 25. (See Figs. 4 and 6.) Thus, the hooks shown in Figure 4 when retracted, or in idle position, are flush with the upper surface of the floor of the car and may be said to "disappear" in that they close the openings or recesses provided for their accommodation and form a solid bottom or platform.

The interchangeable unit containers forming a part of my improved freight carrier are substantially square or angular box-like structures, formed preferably of a suitable metal framework covered with sheet metal or the like. These unit containers are preferably uniform in height in order to present a symmetrical appearance when positioned on the carrier body, but the horizontal dimensions of said containers may be varied so as to provide containers of different capacities. For instance, the larger containers, designated by the numeral 27, are substantially square when viewed in plan, and their width is slightly less than the width of the floor 13 of the carrier. The width of the smaller containers, designated by the numeral 28, is less than half the width of the containers 27, so that said smaller containers have less than a quarter of the capacity of the larger ones, and when a pair of the smaller containers are properly positioned on the carrier body, they are spaced apart to form a centrally arranged aisle or passageway A which extends the length of the carrier body. (See Fig. 3.)

One side of each unit container is provided with one or more doors 29 and formed in the lower portions of the end walls of said containers are apertures such as 30 that are adapted to receive the fingers 24 of the fastening devices when the loaded containers are positioned on the carrier body for transit.

Arranged in the lower end corners of the containers, and forming closures for the apertures 30, are recessed or pocketed castings 31, which accommodate the hooks or fingers 24 when the same are in engagement with the containers and said castings also serving to prevent the leakage of any part of the contents of the container through the opening 30.

Formed in the upper portions of the end walls of the unit containers are pockets or recesses 32 which are adapted to receive hooks or the like, and which latter form a part of the unit loading and unloading mechanism.

Before the loaded containers are positioned upon the carrier for transit, the plates 23 carrying the hooks 24 are swung into upright positions, as illustrated by dotted lines, such operation being accomplished by engaging the outer ends of the shafts 20 with a crank, wrench, or the like, and rotating said shafts to impart movement to the toothed segments 19, and rocking the shafts 17 that carry the unit securing means, and with the hooks thus positioned, the containers are placed on the floor of the carrier between the raised hooks or retaining means. The rock shafts 17 are now manipulated by proper rotation of the shafts 20 and as this movement is accomplished, the hooks or fingers 24 on the ends of the plates 23 will move downward and pass through the apertures 30 into the recessed members 31 and when so positioned, the unit containers will be firmly secured to the carrier body.

To release the unit containers when the same are to be removed from the carrier body, it is only necessary to rock the shafts 17 so as to swing the plates 23 upward and withdraw the hooks or fingers 24 from the apertures 30.

In Figures 8 and 9 I have shown a modified form of the unit securing means, said modified construction including bearing blocks 33 that are centrally arranged in transversely disposed channels 34, the latter being formed in the floor of the carrier body. Journaled in these blocks 33 are rock shafts 35, and carried thereby are hooks 36 which are adapted to engage in recesses or pockets 37 formed in the lower portion of the end walls of the containers. Where this construction is utilized, rails 38, preferably channel-bars, are secured to the undersides of the containers adjacent to the ends thereof, and said channel-bars occupy the outer portions of the channels 34 when the containers are positioned on the carrier body.

While I have illustrated and described the carrier body as having the general form and construction of a flat car, it will be readily understood that said carrier body may take the form of a motor truck, chassis, or for marine service, said carrier may be in the form of a platform or similar structure that is built on the deck of a barge or the like.

Interchangeable unit carriers of my improved construction are comparatively simple, can be easily and cheaply manufactured, and by their use, the handling and transportation of freight is greatly facilitated for by the use of unit containers of varying capacities and providing for the interchangeable use of said containers upon a carrier body, said containers can be loaded at a warehouse, manufacturing plant, mine, or the like, and after being positioned on the carrier body and transported to the destination point, said containers can be readily removed and conveyed to the warehouses or other points where the freight is to be discharged or stored.

Inasmuch as the containers, when closed, are practically water-proof they are particularly desirable for use in the transportation of grain and like material which would be affected by rain or snow.

When the carrier is loaded with filled containers, it performs all of the functions of an ordinary box car, and in addition, any one or more of the containers can be readily detached and unloaded at a way-station without disturbing the other loaded containers. Further, when the unit containers are all removed from the carrier body, the latter can be used in service as an ordinary flat car.

As will be noted by reference to Figure 2, the unit container securing members comprising the plates 23 and hooks 24 are symmetrically disposed in double rows along the sides of the bed or flooring of the carrier, and by virtue of this arrangement, the carrier will accommodate a single row of large containers, a double row of small containers, or a number of large containers and small containers, that is, the containers may be placed in series or in multiple, or both, which latter arrangement is illustrated on the right hand portion of the car body illustrated in Figure 2. By making these containers in units or multiples of units, it is obvious that different sizes of containers may be secured in position on the same carrier, and thus a load of mixed freight can be transported by the same carrier.

Obviously, the constructions and arrangements herein described may be varied or modified to a considerable extent, without departing from the nature and spirit of my invention. Therefore, I do not wish to be limited to the exact details of construction and arrangement shown.

I do not in this application claim a system of transportation including different kinds of carriers each provided with fastening devices complementary to the fastening devices on a container of a unit size or a multiple thereof, as the same forms the subject-matter of a companion application filed by me December 15, 1920, Serial No. 430,902; nor do I claim in this application, fastening devices on the carrier co-operating with a keeper or keepers within the marginal edges of a large multiple unit such as shown at 27, herein, as the same forms the subject-matter of an application for patent filed by me May 10, 1921, Serial No. 468,397.

I claim:

1. The combination with a carrier body having a flat top surface, of interchangeable unit containers adapted to be positioned on said top surface, there being pockets formed in the lower portions of certain of the walls of said unit containers, and means normally positioned below the flat top surface of the carrier and adapted to be swung upward and engaged in the pockets in the containers for securing the same in position on the carrier.

2. The combination with a carrier body having a flat top surface, of interchangeable unit containers adapted to be positioned on said surface and provided with pockets in their walls, transversely disposed rock shafts journaled below the surface of the carrier, and hooks carried by said rock shafts, which hooks are normally positioned below the top surface of the carrier and adapted to be swung upward into locking engagement with the pockets of the containers.

3. The combination with a carrier body having a flat top surface in which are formed recesses, of interchangeable unit containers adapted to be positioned on the surface of said carrier body between said recesses and provided with pockets in their side walls, and means normally positioned in said recesses and adapted to be elevated therefrom for locking engagement with said pockets.

4. The combination with a carrier body having a substantially flat top surface, and there being recesses formed in said top surface, of interchangeable unit containers adapted to be positioned on the surface of the carrier body between the recesses therein, rock shafts journaled in the carrier body below the recesses therein, and unit container engaging hooks carried by said rock shafts and normally positioned in said recesses so as to form a continuation of the carrier top surface.

5. The combination with a carrier body having a substantially flat top surface, of a plurality of interchangeable unit containers of variable dimensions adapted to be positioned on said top surface, and fastening devices normally positioned below the top surface of the carrier and so arranged that a predetermined number of them are adapted to be elevated and engaged with a container irrespective of the dimension of the latter.

6. The combination with a carrier body having a substantially flat top surface, of means lying normally below the top surface of said carrier and adapted to be selectively elevated and engaged with containers of various sizes positioned on said carrier.

7. In combination with a carrier body provided with securing means normally positioned below the upper plane of said body, said securing means being distributed substantially over the entire surface of the carrier body, unit containers adapted to be placed on said carrier body and variously arranged thereon, and means for manipulating the securing means whereby they will engage the containers.

8. The combination of a platform having a recess, a disappearing fastening element operatively mounted in said recess and designed to close the same to form a substantially solid platform when retracted, and a container with which said fastening device cooperates.

9. The combination of a container having a keeper member, a carrier having a platform portion, an opening in said platform, pivotally mounted fastening means designed to close the upper end of said opening, and means for operating said fastening means.

10. The combination of a carrier, a fastening member mounted on said carrier and substantially flush with the upper surface thereof when retracted, a container, and means for operating said fastening member to engage said container.

11. The combination of a carrier, a plurality of fastening members mounted in appropriate recesses in the supporting surface of the carrier and which fastening members are flush with said supporting surface when retracted, a container, and means for simultaneously operating one or more fastening members to engage said container.

12. The combination of a carrier, a plurality of downwardly facing hooked members pivoted adjacent the floor of said carrier, a removable container mounted on said carrier and provided with upwardly facing pockets in its side walls, and means for moving said members on their pivots to enter said recesses to secure said containers on said carrier.

13. The combination of a carrier including a supporting surface provided with recesses, a plurality of downwardly facing hooked members pivoted in said recesses and adapted to fill the same to render the carrier supporting surface uninterrupted, a removable container of a size to extend over a portion of several of said recesses when properly positioned on said carrier and provided with upwardly facing pockets in its side wall adjacent said recesses when so positioned, and means for raising and lowering said members on their pivots to secure said containers on said carrier.

In testimony whereof I hereunto affix my signature this 10th day of February, 1920.

HENRY WILLIAM KIRCHNER.